June 21, 1960  L. PRICE  2,941,813
COMBINATION PORTABLE STOCK LOADING CHUTE AND STOCK TRAILER
Filed July 25, 1958  2 Sheets-Sheet 1
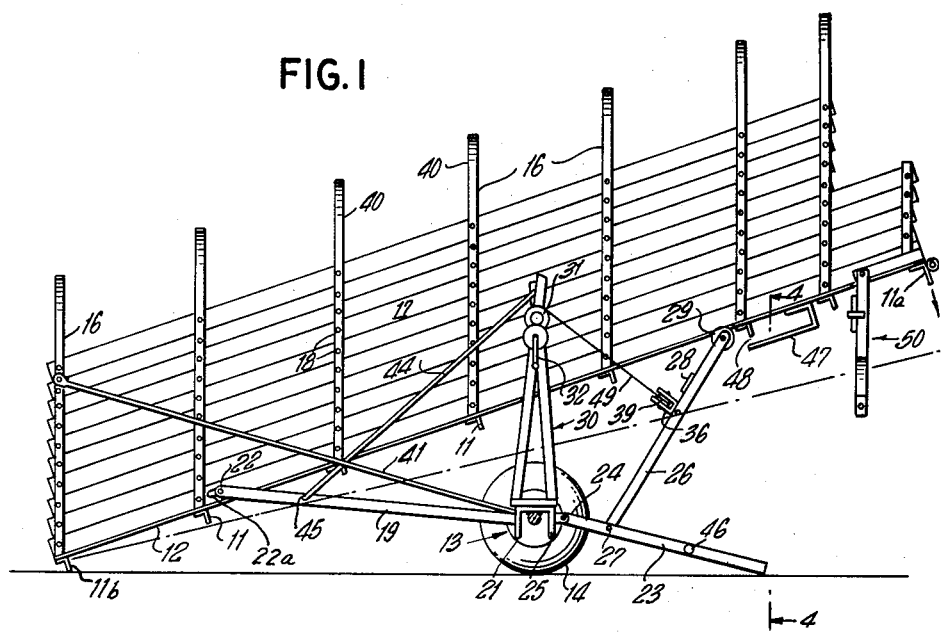
FIG. 1
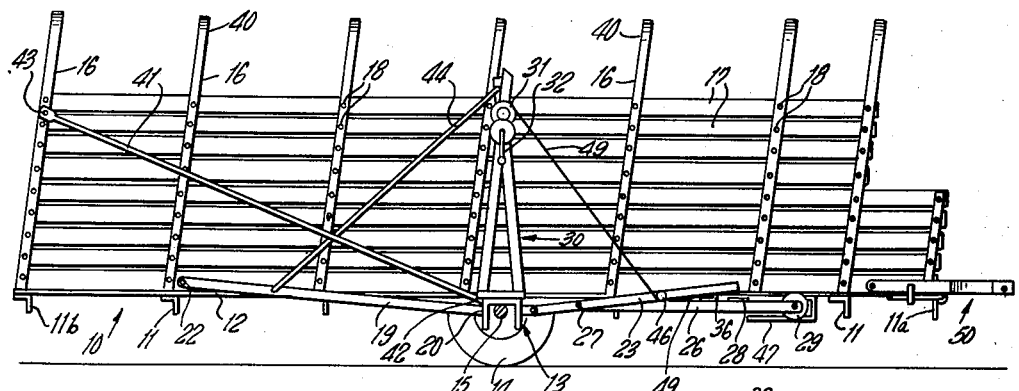
FIG. 2
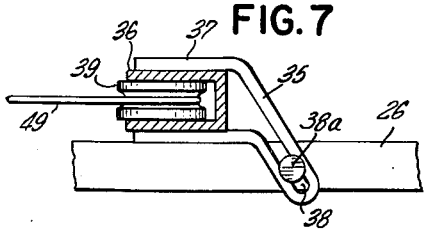
FIG. 7
FIG. 8
INVENTOR.
LAWSON PRICE
BY J. Ledermann
ATTORNEY

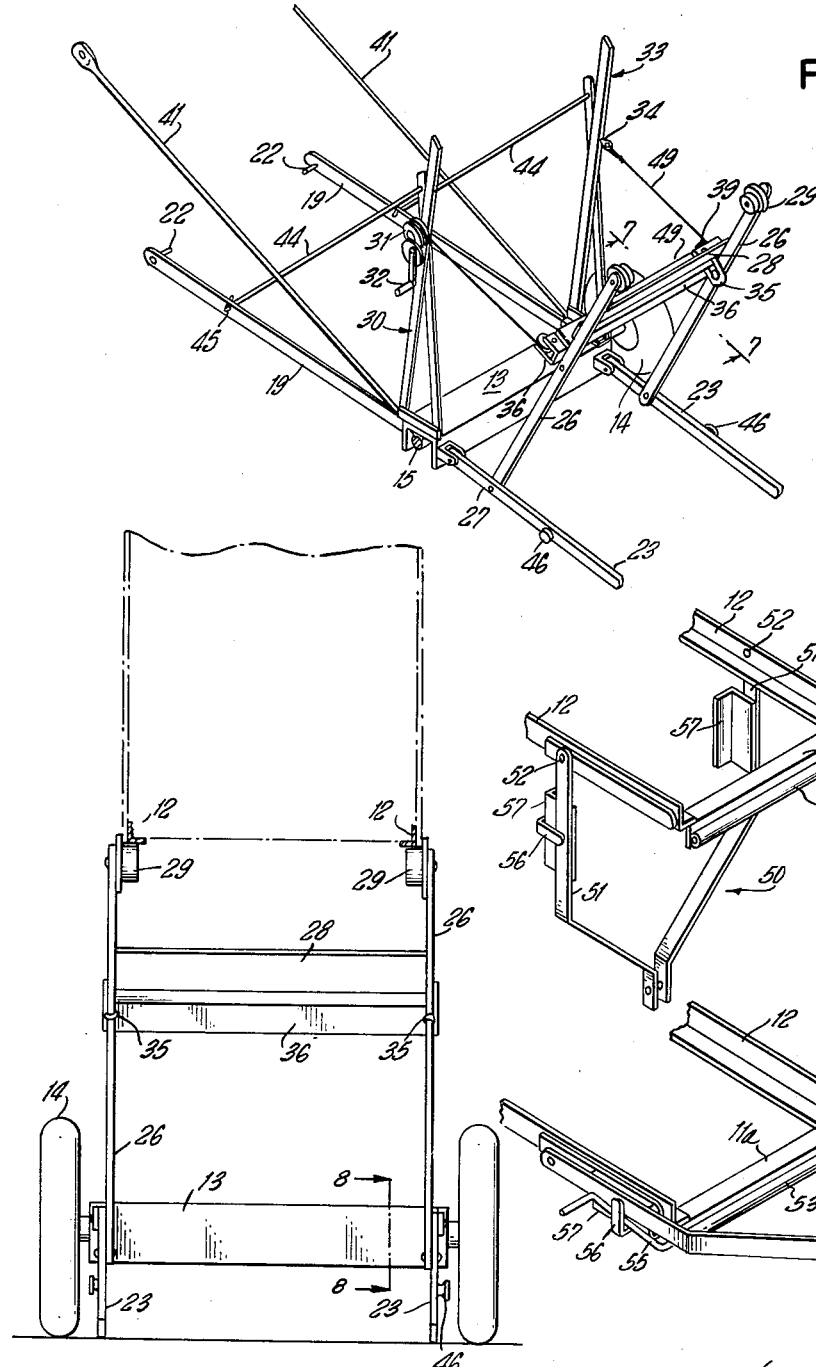

United States Patent Office 2,941,813
Patented June 21, 1960

2,941,813

COMBINATION PORTABLE STOCK LOADING CHUTE AND STOCK TRAILER

Lawson Price, R.R. 1, Rensselaer, Ind.

Filed July 25, 1958, Ser. No. 750,919

9 Claims. (Cl. 280—30)

This invention relates to portable loading chutes and stock trailers, and the main object is the provision of a new and improved combination loading chute and stock trailer which is very easily and quickly convertible from the loading chute to the trailer and vice versa.

Another object of the invention is the provision of a two-wheeled portable loading chute which is balanced at the wheel axle and is provided with a winch and cable operated raising and lowering linkage whereby the chute is readily tilted into substantially horizontal position to serve as a trailer or into inclined position to serve as a chute.

A further object of the invention is the provision of a novel trailer hitch for the chute, which is adapted to be swung down out of the way when the vehicle is used as a chute and to be maintained in substantially horizontal position when the vehicle is used as a stock trailer.

The above broad as well as additional and more specific objects will be clarified in the following description wherein reference numerals refer to like-numbered parts in the accompanying drawings. It is to be understood that the drawings are intended solely for the purpose of invention and that it is therefore neither desired nor intended to limit the invention necessarily to any or all of the exact details of construction shown except insofar as they may be deemed essential to the invention.

Referring briefly to the drawings, Fig. 1 is a side elevational view of the combination portable chute and stock trailer of the present invention, in inclined position for use as a chute.

Fig. 2 is a side elevational view of the same in horizontal position for use as a trailer.

Fig. 3 is a perspective view of the operating linkage, per se, of the vehicle when the latter is in the inclined position of Fig. 1.

Fig. 4 is a sectional view taken on the line 4—4 of Fig. 1.

Fig. 5 is a fragmentary perspective view of the front end of the vehicle frame, showing the trailer hitch in lowered down position.

Fig. 6 is a view similar to Fig. 5 but showing the hitch in elevated position adapted to be coupled to a tractive vehicle, not shown.

Fig. 7 is a sectional view taken on the line 7—7 of Fig. 3, but showing the parts thereof in the position illustrated in Fig. 2.

Fig. 8 is a sectional view taken on the line 8—8 of Fig. 4.

Referring in detail to the drawings, the numeral 10 indicates the vehicle frame which includes the longitudinal side members 12 and longitudinally spaced transverse members 11. The transverse front end member of the frame is indicated by the numeral 11a and the similar rear end member by the numeral 11b. A floor is provided on or supported by the frame members in any suitable manner, but is not shown.

The axle 13 for the two wheels 14 is a channel beam, that is, U-shaped in cross-section, and is positioned with the U inverted. The stub shafts 15 for the wheels are secured, in any desired manner, in the ends of the axle. On each side of the frame, longitudinally spaced posts 16 are pivoted at their lower ends to the vertical web of the frame angles or members 12. Normally slightly vertically spaced parallel slats 17 are pivoted, as at 18, to each of the posts 16.

On each side of the frame, a rigid bar 19 has one end 20 welded to the rear vertical wing 21 of the axle 13 and has its other end secured by a bolt 22 in a slot 22a to the member 12 near the rear end of the frame. Bars 23 have their rear ends pivoted at 24 to the front vertical web 25 of the axle, near the ends of the latter. Bars 26 are pivoted at their lower or rearward ends, at 27, to the bars 23 at a position spaced forward of the pivots 24 of the latter. On their upper ends the bars 26 carry rollers 29 which ride on the underside of the longitudinal frame members 12. A cross member 28 maintains rigidity between the upper ends of the bars 26.

A standard 30 is rigid on the top surface or portion of the axle 13 at one end of the latter, and carries a winch 31 adapted to be turned by a crank 32. Another standard 33 is rigid on the top of the axle at the other end thereof and is provided with a hook or eyelet 34.

A pulley carriage 36 is U-shaped in cross-section and is secured to the bars 26 in a manner so that it may pivot, one such way being illustrated. Loops or straps 35, which may have their ends 37 welded to opposite sides of the carriage or cradle 36, are deformed at an angle to provide slots or eyelets 38. Headed pins or bolts 38a welded to the bars 26 have the eyelets 38 engaged pivotally and, to some extent, slidably thereon. Pulleys 39 are mounted at or near the ends of the cradle 36.

Actually each pair of transversely opposed posts 16 are the legs of yokes 40, so that such pairs of posts are unitary with respect to each other, with the upper or connecting portions of the yokes extending across the vehicle above the slats 17. Thus, a tarpaulin may be secured over the top of the vehicle, on the yokes, if desired.

On each side of the vehicle, an elongated link 41 has one end pivoted to the axle 13 at 42 and the other end pivoted at 43 to the rearmost post 16 near the upper end of the post. Braces 44 are provided on opposite sides, secured at one end to the top of the standards 30 and 33 and at the other or lower end to the bar 19 at 45. It is to be noted that the standards 30 and 33 are both shown cross-shaped; they may, of course, be of any other suitable form. On its outer side, each bar 23 has a roller or other suitable means 46, for the purpose mentioned below.

Close to the forward end of the frame 10, on each side thereof, a U-shaped member 47 is welded to the underside of the longitudinal members 12, with the open end or mouth of the U facing rearward.

Fig. 2 shows the vehicle in horizontal position for use as a trailer. In this position the cable 49 which extends from the winch 31 passes under the rollers or pulleys 46 on the bars 23 and thus supports the bars 23 well above the ground level. The cable is thus passed around these rollers when the vehicle is horizontal, just for that purpose, as normally the rods or bars 23 are free to fall to the ground, as shown in Fig. 1.

As is apparent in Figs. 1 and 3, the cable 49 extends from the winch around both pulleys 39 and is tied to the hook or the like 34 on the standard 33. To raise the vehicle into the inclined position of Fig. 1, the cable is first undone from the rollers 46, thus permitting the bars 23 to swing to the ground into the position shown in Fig. 1. Then upon winding the cable on the winch, it is apparent that the bars 26 are swung counter-clockwise on their pivots 27, whence the rollers 29 ride on the undersides of the frame members 12, thus tilting the vehicle counter-clockwise into the position of Fig. 1. As the vehicle is thus tilting, owing to the links 41 and to the pivotal attachment of the slats 17 to the posts 16, and to the pivotal connection of the bolts 22 with the frame members 12, it is apparent that the posts tend to remain approximately upright and the slats all slide, one upon the other, in a forward direction with respect to the frame. As a result the fences formed by the slats, when the vehicle is horizontal, have horizontal openings between the slats but the animals can not see through the fences and thus remain calmer than when they are able to see through. Front and rear gates, not shown are of course provided to close the ends of the vehicle.

Owing to the triangle formed by the brace 44, the standard 30 or 33, and the bar 19, the frame in tilting pivots above the axis of the pivot bolts 22, so that its front end rises relatively high, as to a loading platform, and while the cable is taut it remains in that position.

To restore the vehicle to horizontal position, the cable is slackened whence the weight of the forward part of the vehicle causes the latter to swing clockwise. As the bars 26 swing clockwise the rollers 29 pass into the support 47, ultimately attaining the position shown in Fig. 2. The final adjustment of the rollers 29 and their bars 26 is attained by looping the cable around the rollers 46, as previously mentioned and as shown in Fig. 2, and then tautening the cable, thus raising the bars 23 and registering the rollers 29 in the members 47, where the rollers 29 are further supported.

Fig. 7 shows the position of the cradle 36 when the vehicle is ready for use as a trailer as shown in Fig. 2, the loops 35 permitting the cradle to swing and otherwise adjust its position so as not to interfere with the positioning of the collapsed linkage, as is obvious.

The draw-bar hitch 50 illustrated in Figs. 5 and 6 comprises the yoke whose arms 51 are pivoted at their ends to the forward ends of the frame members 12, the pivots 52 being positioned rearward on the members 12 a distance substantially equal to the length of the arms 51. Thus, when not used as a hitch, the yoke may hang from its pivots as shown in Fig. 1. A pipe 53 is welded to the vertical web of the front frame member 11a, adapted to have a rod 54 slid therethrough, the rod having a greater length than the width of the yoke 50 and being preferably provided with a crank-like handle 55. When the hitch is swung into horizontal position, as shown in Fig. 6, the rod 54 is passed through the pipe and under the arms 51 to support it, and an upwardly extending hook or a catch 56 on one arm 51 retains the handle 55. To prevent upward swinging of the hitch past the horizontal, angles 57 are welded to the arms 51, to engage the undersides of the members 12.

The invention having thus been described, what is claimed and desired to be secured by Letters Patent is as follows:

1. A combination portable stock loading chute and stock trailer including a substantially rectangular frame having side members and front and rear end members, a wheel axle positioned transversely of the frame approximately intermediate the length thereof having wheels rotatably mounted on the ends thereof, two mutually parallel bars rigid at one end thereof with the axle and pivoted at the other ends thereof to the side members on a common axis positioned near but spaced from the rear end member, two mutually parallel forwardly extending bars pivoted at one end to the axle on a common axis and having their other ends free whereby the bars are normally adapted to swing by gravity so that their front ends contact the ground, two parallel lifting arms pivoted at one end to said forwardly extending bars on a common axis near but spaced forward from the pivot axis of the forwardly extending bars, said arms having rollers on their extremities in riding engagement with the undersides of said side members, and means for swinging said arms upward about their pivots to tilt the frame by raising the forward portion thereof thereby causing the rollers to ride rearward on the side members to a position wherein the rear end member contacts the ground.

2. The combination set forth in claim 1, said means comprising uprights rigid on the ends of the axle, one of the uprights having a winch thereon, the other of the uprights having cable securing means thereon, pulleys on said arms, and a cable extending from the winch passing through said pulleys and having its extremity secured to said cable securing means.

3. The combination set forth in claim 1, said side members having longitudinally spaced posts pivoted at their lower ends thereto, each post on one side of the frame lying in a common transverse plane with a post on the other side thereof thereby providing pairs of posts, said posts having vertically spaced longitudinal slats pivoted thereto, two parallel rods pivoted at one end to the ends of the axle and at their other ends to one of said pairs of posts remote from the axle.

4. The combination set forth in claim 3, said last-named pair of posts comprising the rearmost of the pairs of posts.

5. The combination set forth in claim 2, said forwardly extending bars having cable engaging projections on the sides thereof positioned between the pivot axis thereof and the front ends thereof, said frame when said winch is unwound to relax the cable being free to be swung in the reverse direction and being adapted to be supported in substantially horizontal position, said arms when said frame is substantially horizontal being adapted to extend substantially parallel with said side members, said cable when said frame is substantially horizontal being adapted to be looped under said projections and tautened thereby to lift said forwardly extending bars and thus position said arms substantially horizontally.

6. The combination set forth in claim 5, said side members having on the underside thereof near the front ends thereof rearwardly extending supports spaced below the side members and having said rollers positioned thereon when said arms are substantially horizontal.

7. The combination set forth in claim 1, having means on the forward end of the frame for hitching the same to a tractor comprising a yoke having the ends of the two arms thereof pivoted to said side members rearward of said front end member, and means for releasably locking the yoke substantially in alignment with said frame.

8. The combination set forth in claim 7, said locking means comprising a transverse pipe on the front end member of the frame of shorter length than the width of the yoke, a rod of greater length than the width of the yoke adapted to be passed under the yoke and through the pipe to prevent the yoke from swinging downward, stops on the yoke arms engageable with the undersides of said side members thereby preventing upward swinging of the yoke, and means for releasably locking the rod in the pipe.

9. The combination set forth in claim 8, said rod having an arm at right angles thereto on one end thereof, said means for releasably locking the rod in the pipe comprising an upwardly extending hook on one of the yoke arms having said last-named arm registrable therein.

References Cited in the file of this patent

UNITED STATES PATENTS

| 711,142 | Williams | Oct. 14, 1902 |
| 2,466,102 | Heldenbrand | Sept. 19, 1947 |
| 2,679,433 | Wasinger | May 25, 1954 |
| 2,803,362 | Saenz | Aug. 20, 1957 |

FOREIGN PATENTS

| 742,679 | France | Jan. 4, 1933 |